Feb. 9, 1932.  A. R. HAVENER  1,844,120
RIVETING MACHINE
Filed Feb. 18, 1931   6 Sheets-Sheet 1

Inventor:
Arthur R. Havener.
by Charles S. Gooding,
Atty.

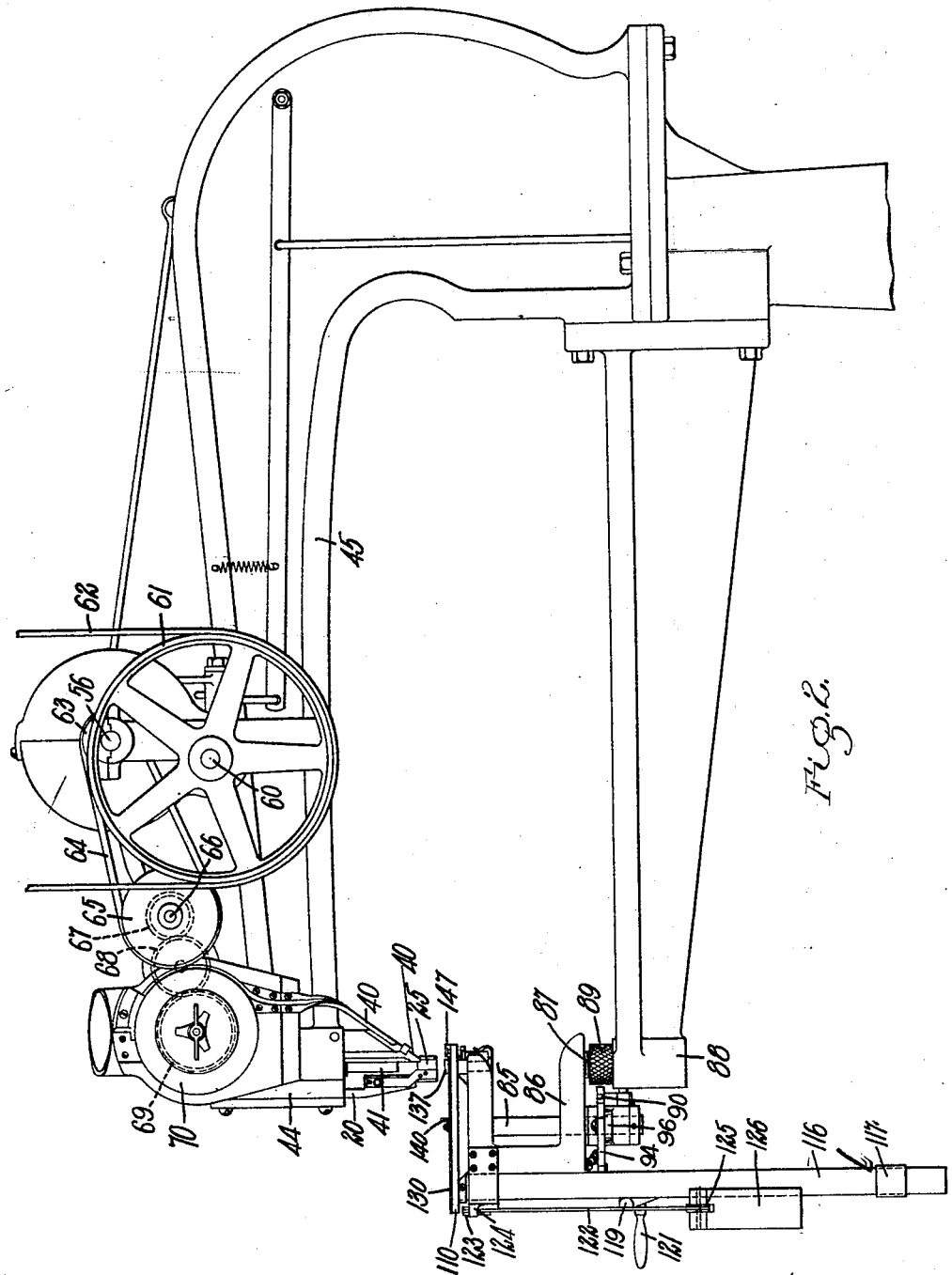

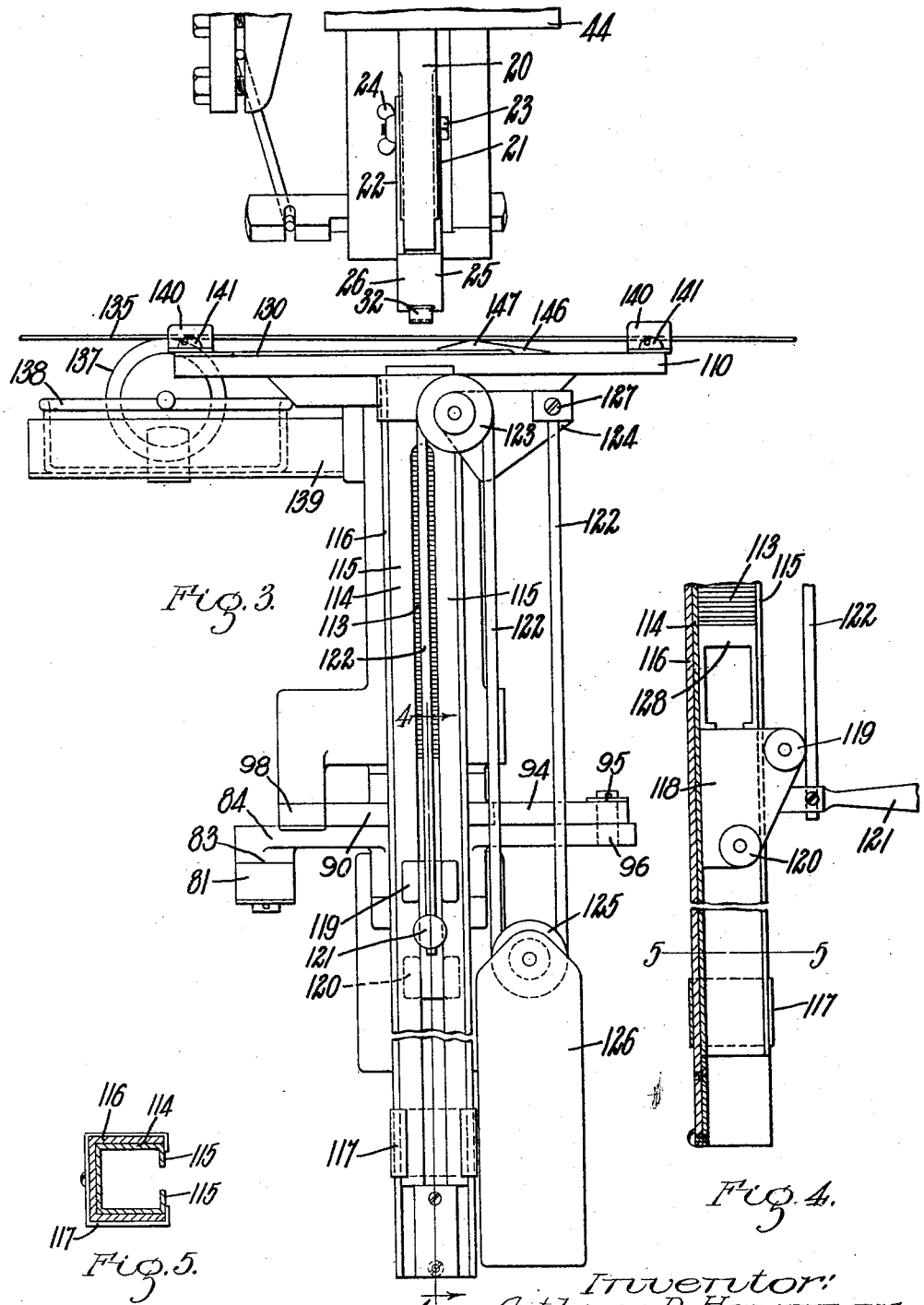

Feb. 9, 1932.   A. R. HAVENER   1,844,120
RIVETING MACHINE
Filed Feb. 18, 1931    6 Sheets-Sheet 5

Inventor:
Arthur R. Havener,
by Charles S. Gooding,
Atty.

Inventor:
Arthur R. Havener.
by Charles S. Gooding,
Atty.

Patented Feb. 9, 1932

1,844,120

UNITED STATES PATENT OFFICE

ARTHUR R. HAVENER, OF WAYLAND, MASSACHUSETTS, ASSIGNOR TO JUDSON L. THOMSON MANUFACTURING CO., OF WALTHAM, MASSACHUSETTS, A CORPORATION OF MASSACHUSETTS

RIVETING MACHINE

Application filed February 18, 1931. Serial No. 516,600.

This invention relates to a riveting machine.

The object of the invention is to provide a riveting machine which can feed discs and position them adjacent to one face of a piece of sheet material and which can also feed and drive rivets through said material and clinch the rivets in said discs.

The invention further relates to a riveting machine which is adapted to position a piece of flat material slotted longitudinally thereof and having one end forming a hook adjacent to one face of a sheet of material and also which is adapted to feed and position a disc adjacent to the opposite face of said sheet material, the machine being further adapted to position a two-pronged rivet in alignment with the slot in said hooked piece of material and attach the said hooked piece of material to said piece of sheet material by a rivet, preferably a two-pronged rivet and clinching said rivet in the disc.

The present embodiment of this invention is adapted to attach a hooked piece of flat material to a moth-proof bag adjacent the opening thereof, whereby the two edges of the bag opening may be held together, the hooked member being slidable upon the rivet, whereby it is attached to one side of the bag adjacent the opening.

The invention consists in the improved mechanism hereinafter set forth in the specification and particularly in the combination and arrangement of parts set forth in the claims.

In the specification and in the claims the word "disc" is used to indicate the piece of material to which the rivet is clinched. This disc is shown as being circular, but it is to be understood that the said disc may be of any desired contour without departing from the spirit of this invention.

Referring to the drawings:—

Fig. 2 is a right hand side elevation of the said machine.

Fig. 3 is a front elevation of the disc-feeding mechanism and a portion of the rivet feeding and driving mechanism.

Fig. 4 is a sectional elevation taken on line 4—4 of Fig. 3, broken away and illustrating the disc magazine.

Fig. 5 is a sectional plan taken on line 5—5, Fig. 4.

Like numerals refer to like parts throughout the several views of the drawings.

Figure 12:
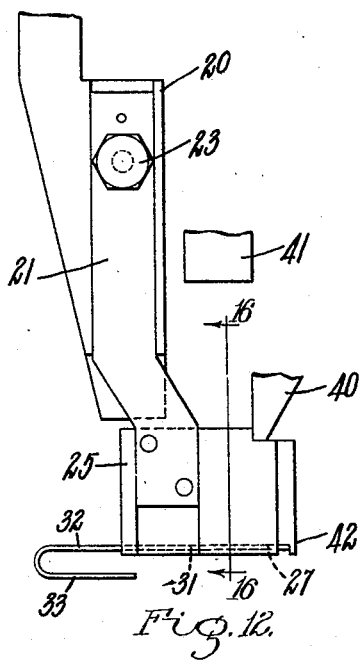
Fig. 12 is a right hand side elevation of the holder and carrier of this invention, a portion of the driver and raceway being illustrated in connection therewith.
Figure 13:
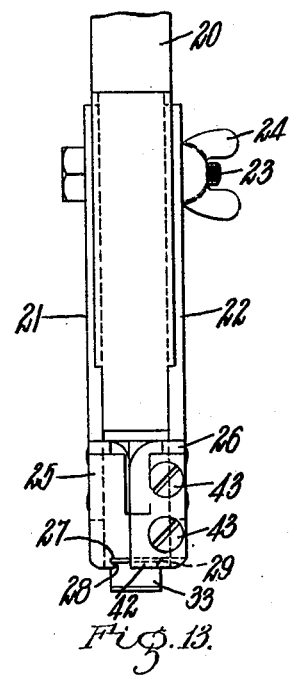
Fig. 13 is a rear elevation of the parts illustrated in Fig. 12, the driver and raceway being omitted.
Figure 14:
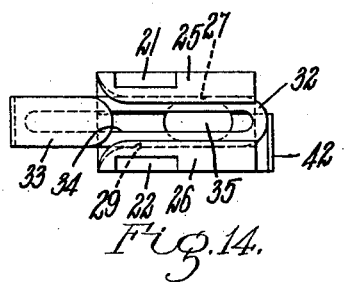
Fig. 14 is an underneath plan of the parts illustrated in Fig. 12, the raceway and driver being omitted.

In the drawings, Fig. 12, 20 is a holder and carrier slide. A pair of oppositely disposed spring arms 21 and 22 are fastened to the slide 20 by a bolt 23 and nut 24. These spring arms are offset at their lower ends and have fastened to their lower ends a pair of oppositely disposed plates 25 and 26, the plates 25 and 26 being fastened respectively to the spring arms 21 and 22 and interposed therebetween.

The plate 25 is provided in its lower face with a groove 27 which has a recessed or inclined wall 28. The plate 26 also has in its under face a groove 29 with a similar recessed side wall 30. The two grooves 27 and 29 combine to form a guideway 31 which is adapted to receive and hold a flat piece of material 32 which is bent at one end to form a hook 33. The said flat piece of material 32 is provided with a slot 34 extending longitudinally thereof.

Figure 15:
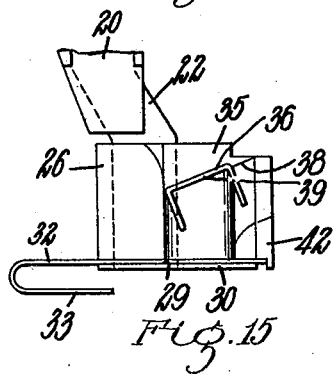
Fig. 15 is a view similar to Fig. 12 with the right hand holder plate and its supporting spring removed, a two-pronged rivet being illustrated in position and also a hooked plate.
Figure 17:
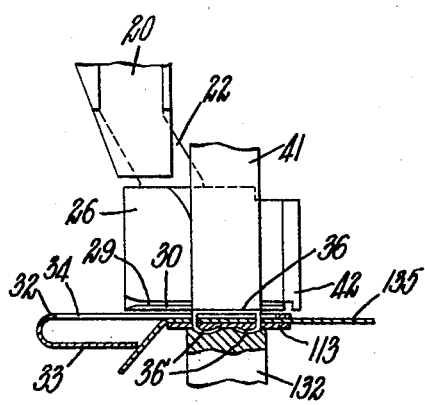
Fig. 17 is a view in elevation similar to Fig. 15, but with the parts in the relative positions occupied thereby at the end of the clinching of a rivet in the material, the hooked plate being shown in connection therewith in section.
Figure 16:
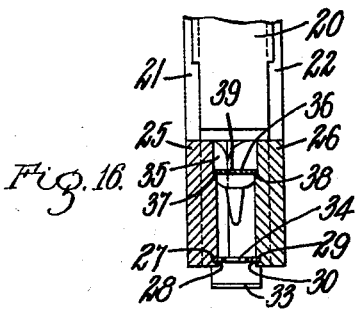
Fig. 16 is a sectional elevation taken on the line 16—16 looking toward the left in Fig. 12.

The plates 25 and 26 are spaced apart to form a chamber 35, Fig. 15, adapted to receive a two-pronged rivet 36. The inner faces of the plates 25 and 26 are recessed to form a pair of oppositely disposed inclined ridges 37 and 38 respectively, and these inclined ridges support the two-pronged rivet 36 upon the opposite sides of its head 39, as particularly illustrated in Fig. 16. The rivets are delivered into the chamber 35 by a raceway 40 in a manner well-known to those skilled in the art.

Figure 1:
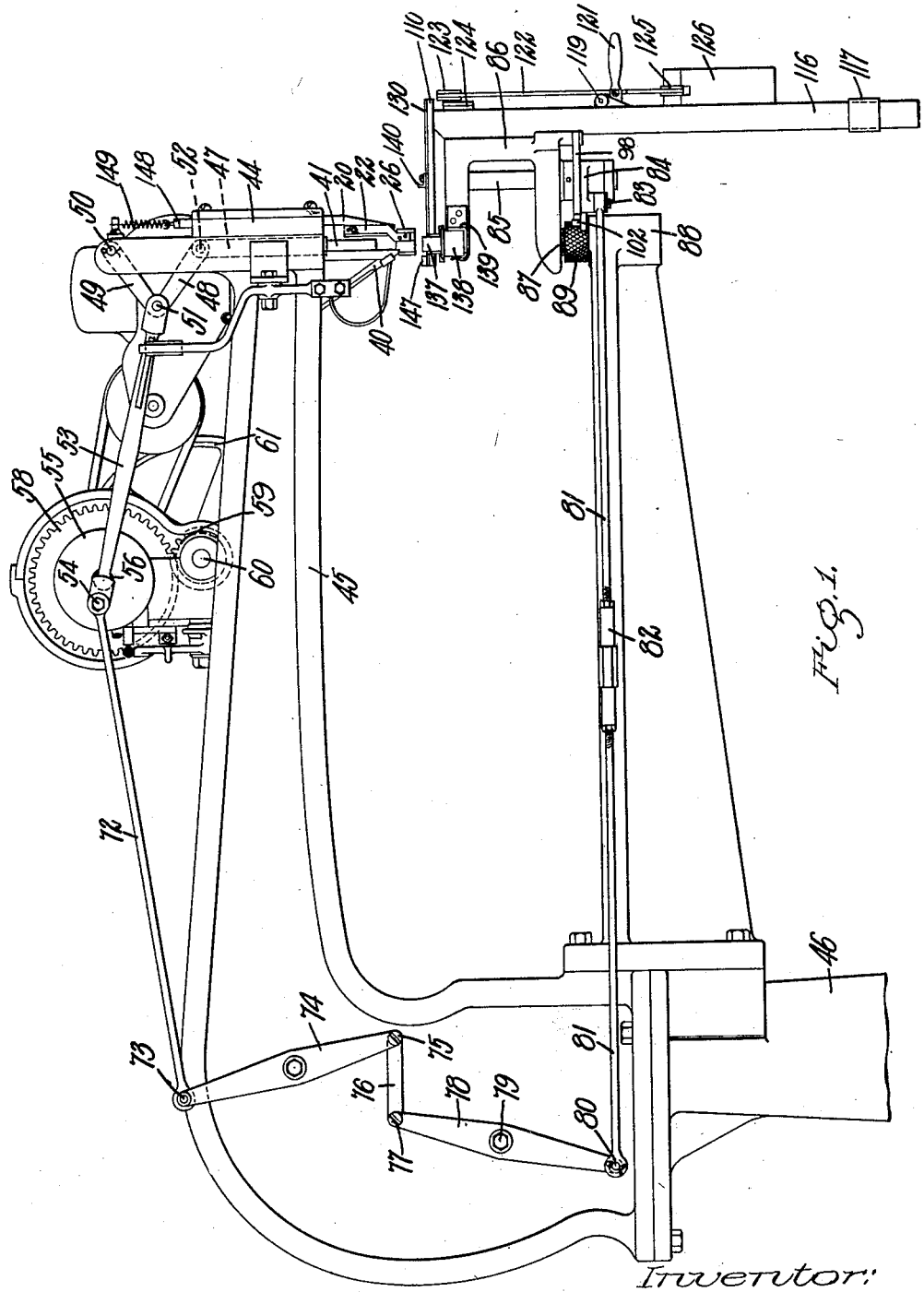
Fig. 1 is a left hand side elevation of a riveting machine embodying my invention.

The rivet 36 and the hooked plate 32 are driven out from between the holder plates 25 and 26 by a driver 41, Figs. 1 and 12. The hooked plate 32 is inserted in the guideway 31 as illustrated in the drawings, by hand, and the said hooked plate is positioned longitudinally thereof with relation to the rivet driver 41 by a stop 42 which is fastened by screws 43 to the plate 26.

The rivet driver 41 and the carrier 20 for the rivet are slidably mounted in the head 44 of a frame 45 which is fastened to a column 46. A reciprocatory motion is imparted to the driver 41 by a driver slide 47, Fig. 1, slidably mounted in the head 44 and having a reciprocatory motion imparted thereto by a pair of toggle links 48 and 49. The link 49 is pivotally attached at 50 to the head 44 at one end thereof and at the other end thereof is pivoted to a pin 51. The link 48 is also pivoted at one end thereof to the pin 51 and at the other end to a pin 52 in the top of the driver slide 47.

The pin 51 has a connecting rod 53 attached thereto, the said connecting rod being attached at its other end to an eccentric pin 54 on a rotary disc 55, which disc is fastened to a shaft 56 to which a rotary motion is imparted by gears 58 and 59. The gear 59 is fast to a main driving shaft 60 of the machine, which has a rotary motion imparted thereto by a pulley 61 and belt 62. The shaft 56 has a pulley 63 thereon which is connected by a belt 64 to a pulley 65 fast to a shaft 66 and to the shaft 66 is fastened a gear 67 which drives other gears 68 and 69 by which rotary motion is imparted to the rotary member of a hopper 70, from which hopper the two-pronged rivets are fed down raceway 40 to the carrier and holder 20 in a manner well known to those skilled in the art, so that the eccentric pin 54 imparts a reciprocatory motion to the driver 41 and through the driver a reciprocatory motion is imparted to the carrier 20, and the said eccentric pin 54 also has pivotally connected thereto a rod 72 which at its other end is pivotally connected at 73 to a lever 74 pivoted to the frame 45.

Figure 7:
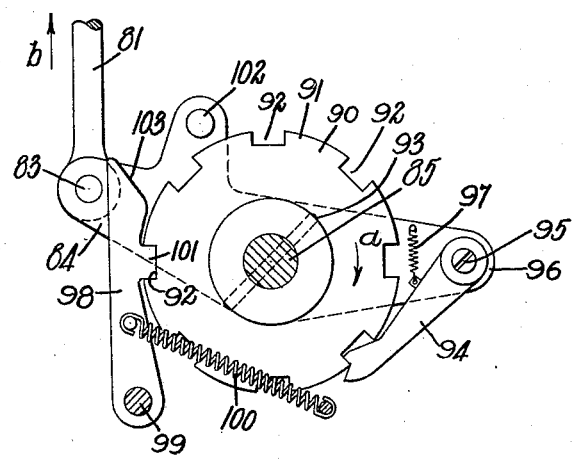
Fig. 7 is a detail sectional plan of the mechanism which imparts to the disc-feeding member an intermittent rotary movement.

The lower end of the lever 74 is pivotally attached at 75 to a link 76 which at its other end is pivotally attached at 77 to a lever 78 pivoted at 79 to the frame 45 and having a pin 80 fast to its lower end to which is pivotally attached a rod 81 provided with a right and left turn buckle 82. The front end of the rod 81, see Figs. 1, 2 and 7, is pivotally attached at 83 to a rocker plate 84 which is pivotally mounted on a shaft 85. The shaft 85 is rotatably mounted in a U-shaped bracket frame 86 which is adjustably fastened by a screw-threaded stud 87 to the front end of an arm 88 fast to the column 46 and to the frame 45. The stud 87 has an adjusting nut 89 in screw-threaded engagement therewith, whereby the U-shaped bracket frame 86 may be adjusted vertically.

The shaft 85 has fastened thereto at its lower end a ratchet wheel 90 provided with teeth 91 with rectangular spaces 92 therebetween. The ratchet wheel 90 is fastened by a pin 93 to the shaft 85, and an intermittent rotary movement is imparted to the ratchet 90 and also to the shaft 85 by a pawl 94 pivotally mounted at 95 to an arm 96 on the rocker plate 84. A spring 97 holds the pawl 94 in engagement with the ratchet 90.

A stop pawl 98 is pivoted at 99 to the frame 86 and is held in engagement with the ratchet 90 by a spring 100, one end of which is fastened to the pawl 98 and the other end to the frame 86. The pawl 98 is provided with a tooth 101 which projects into the recesses 92 and locks the ratchet 90 against rearward movement, or against movement opposite to that of the arrow a, Fig. 7, when the rod 81 is being moved opposite to the arrow b, Fig. 7. When the rocker plate is moved by the rod 81 in the direction opposite to the arrow a, as aforesaid, a pin 102, which is fastened thereto, engages the inclined forward end 103 of the pawl 98 and swings the pawl 98 outwardly to disengage the tooth 101 from the ratchet, so that upon reversing the movement of the rocker plate 84, or when it is moved in the direction of the arrow, the pawl 94 will be free to move the ratchet 90 until it is locked in position again by the pawl 98.

Figure 6:
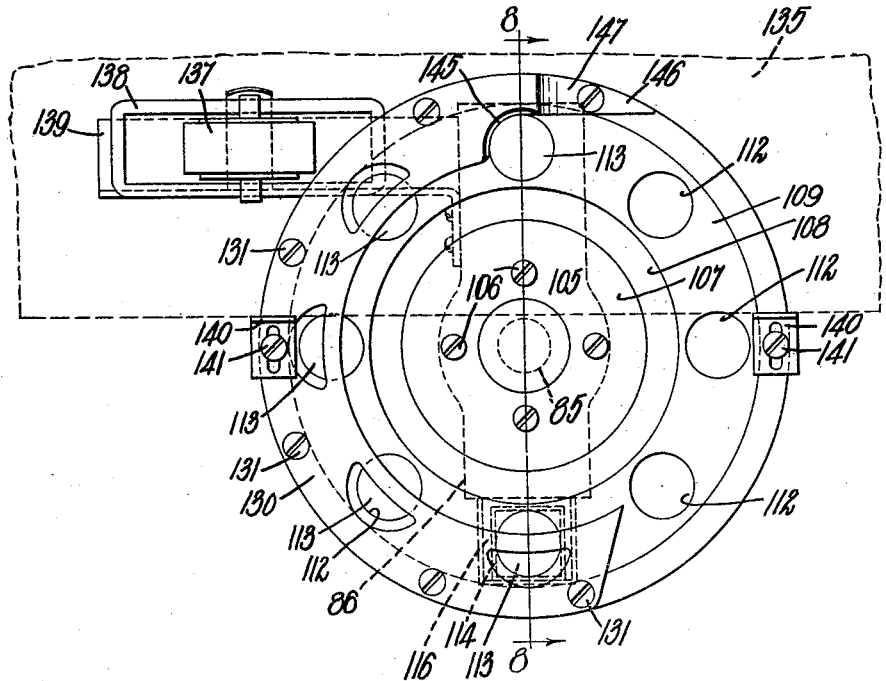
Fig. 6 is a plan view of the means for feeding discs from the magazine to the anvil and also of the device for moistening the material to which the discs are to be attached.
Figure 8:
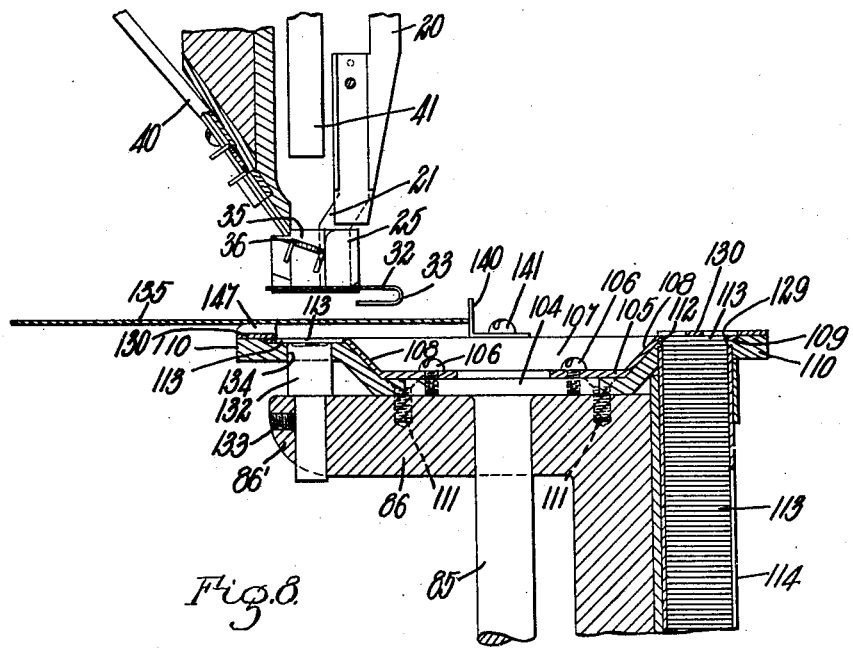
Fig. 8 is a sectional elevation taken on line 8—8, Fig. 6, viewed in the direction of the arrows in said figure and illustrating the rivet feeding and driving mechanism and the disc-feeding and positioning mechanism and magazine.

The upper end of the shaft 85, see Figs. 6 and 8, is provided with a flange 104 to which is fastened a disc-feeding member 105 which is fastened to the flange 104 by screws 106. The central portion of the disc-feeding member 105 is provided with a chamber 107 which is surrounded by a tapered wall 108, the upper edge of which is surrounded by a horizontal flange 109 forming a part of the disc-feeding member 105. The horizontal flange 109 is rotatably mounted in a disc-supporting plate 110 which is fastened to the U-shaped frame 86 by screws 111. The flange 109 is provided with a plurality of orifices 112 which extend therethrough and are adapted to receive discs 113 which are fed into said orifices from a magazine 114. These discs are illustrated as circular, but they may be of other contour without departing from the spirit of the invention.

The magazine 114 (see Figs. 3, 4 and 5) is channel shaped and has oppositely disposed flanges 115 on the front thereof and it is positioned in a casing 116 which is fastened to the U-shaped bracket frame 86. The magazine 114 is held in the casing 116 by a channel-shaped clamp member 117. Slidably mounted within the magazine 114 is a block 118 which is guided in vertical movement within the magazine 114 by rolls 119 and 120, the roll 119 bearing against the outside face of the flanges 115 of the magazine, and the roll 120 bearing against the inside faces of the flanges 115.

A handle 121 is fastened to the block 118 by which the said block can be moved upwardly or downwardly in the magazine 114 and this handle has fastened thereto a cord 122 which passes upwardly therefrom and over a roll 123 which is supported upon a bracket 124 fast to the frame 86. The cord 122 passes downwardly from the roll 123 around another roll 125 which has mounted thereon a block 126 and from the block 126 the cord 122 extends upwardly and is fastened at 127 to the bracket 124, so that the weight 126 will be continually pulling upwardly through the cord 122 upon the weight 118 and the weight 118 has a pusher 128 on the top thereof in the magazine 114 upon which rest a column of discs 113. These discs are pushed upwardly in this manner until the uppermost disc of the column passes through a hole 129 in the disc-supporting plate 110 and into whichever one of the orifices 112 may be aligned with the magazine.

A cap plate 130 is fastened by screws 131 to the supporting plate 110 and this cap plate extends over the orifice 112 in the rotary disc-feeding member 105, which may be positioned at any one time over the magazine 114 and the said cap plate also projects over the three orifices in advance of the orifice over the magazine. The disc-feeding member 105 in the present embodiment of the invention has eight orifices 112 extending therethrough, and an anvil 132 is positioned in alignment with the orifice 112 which is diagonally opposite the orifice 112 in alignment with the magazine. The anvil 132 is fastened to the upper arm 86′ of the bracket frame 86 and is held in position therein by a set screw 133. The upper end of the anvil 132 projects through a hole 134 in the disc-supporting plate 110 and the upper surface of the anvil is flush with the bottom surface of the disc-feeding member 105, the anvil being in alignment with the rivet driver 41.

Figure 9:
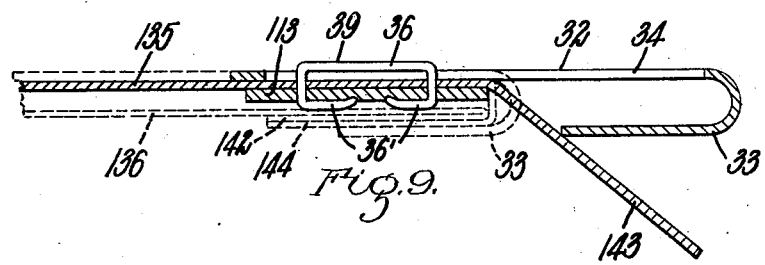
Fig. 9 is an enlarged section taken through the hooked member and the rivet which attaches it to the material and the disc in which the rivet is clinched.
Figure 11:
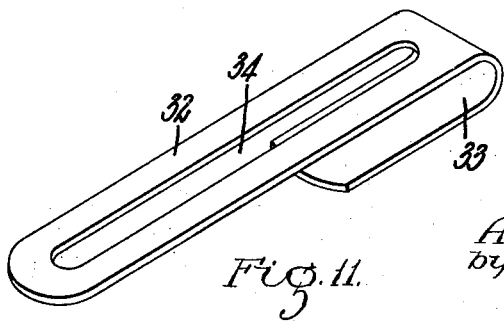
Fig. 11 is a perspective view of the slotted hooked member.
Figure 10:
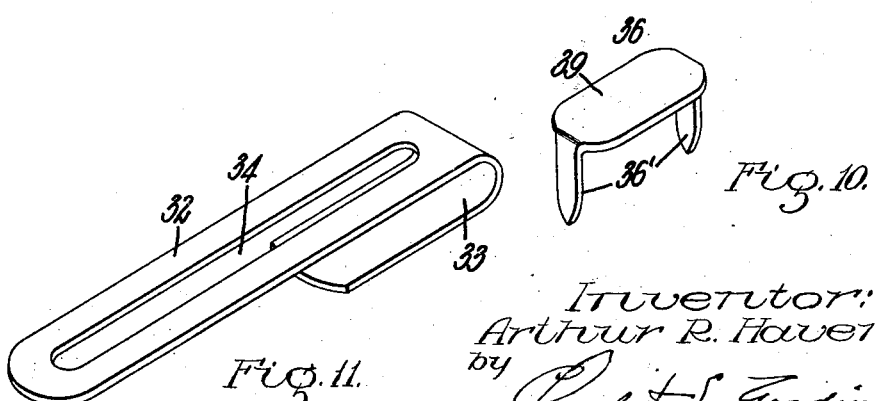
Fig. 10 is a perspective view of a two-pronged rivet adapted to be used in the machine of this invention.

Referring to Figs. 6, 8 and 9, 135 is a piece of flat material representing one side of a moth-proof bag adjacent the opening thereof. 136, illustrated in dotted lines, Fig. 9, is the other side of the moth-proof bag adjacent the opening thereof. The side 135 of the bag is shown in Fig. 8 positioned to have the hook 33 attached to one face thereof and one of the discs 113 attached to the opposite face thereof. The upper faces of the discs 113 are covered with adhesive material and the under face of the side 135 of the bag is moistened so that when the hook 33 is attached to the upper face of the sheet material 135 and the disc is pressed against the under side of the sheet material 135 the rivet is driven through the sheet material and through the disc and is clinched in the disc as illustrated in Fig. 9, thus the disc is not only riveted to the sheet material 135 but is also adhesively attached thereto.

The under face of the sheet material 135 is moistened by feeding it by hand over a roll 137, see Figs. 3 and 6. The roll 137 is rotatably mounted upon and projects into a container 138 which has water therein into which the roll 137 projects. The container 138 is supported upon a bracket 139 which is fastened to the U-shaped bracket frame 86, and as the sheet material 135 is fed into the machine by hand ready to have the hook and disc applied thereto, it is guided by a pair of angle guides 140 which are adjustably fastened by screws 141 to the disc-supporting plate 110.

When the hook and disc are being attached to the sheet material 135 forming one side 136 of the bag, the other side of the bag hangs down beneath the arm 86′ of the U-shaped frame 86. After the hook and disc have been fastened to the side 135 of the bag and the bag has been removed from the machine, the side 136 is brought by the user toward the side 135 in the position shown by dotted lines, Fig. 9, and folded back on itself at 142, then the end 143 of the side 135 is folded over the side 136 and the portion 142 thereof, as shown in dotted lines at 144, Fig. 9, and the hook 33 and the flat portion 32 are slid along the bag and along the rivet 36 from the position shown in full lines, Fig. 9, to that shown in dotted lines therein, thus clamping the sides 135 and 136 to each other and closing the interior of the bag.

The cap plate 130, Fig. 6, has an arcuate portion 145 adjacent the orifice 112 which is in alignment with the anvil 132 and is extended therebeyond as illustrated in Fig. 6 at 146 and also inclined upwardly to form a projection 147, the object of this projection being to lift the bag and the disc away from the anvil, thus removing the disc from the disc-feeding member 105.

The general operation of the mechanism hereinbefore specifically and to some extent in general described is as follows:—The operator stands in front of the machine, that is, to the right of Fig. 1. The side 135 of the bag is fed forward by hand from left to right as viewed in Fig. 3 while the side 35 is positioned against the angle guides 140, thus the face of the side 135 of the bag will be moistened which is adjacent to the disc 113 at that time positioned over the anvil 132. The two-pronged rivet 36 descends the raceway 40 and the lowermost rivet in the raceway enters the chamber 35 between the plates 25 and 26 of the rivet holder, sliding into the chamber 35 and assuming the position illustrated in Fig. 8, the opposite edges resting upon the ridges 37 and 38 in the plates 25 and 26. The hooked plate 32 having been placed in position as illustrated in Fig. 8, the driver 41 descends and the lower end thereof passes into the chamber 35 and contacts with the top 39 of the rivet 36. The carrier slide and the holder attached thereto are then pushed down by the driver until a stop 148, Fig. 1, on the carrier slide engages the frame of the machine, whereupon when the driver descends still further, the two-pronged rivet will be thrust downwardly in the chamber 25, the two plates 25 and 26 spreading apart to allow the said rivet to pass downwardly. The prongs of the rivet pass through the slot 34 in the hooked plate 32 and then through the material 135 and through the disc 113 positioned between the material 135 and the anvil 132. The driver continues to push the rivet downwardly until the prongs 36' are clinched by the anvil 132 into the disc 113 as illustrated in Fig. 9. During the latter part of the descent of the driver the hooked plate 32 will be forced out from between the plates 25 and 26 and attached to the upper face of the material 135, all as illustrated in Fig. 9. The driver then moves upwardly and the carrier slide with the rivet and hooked plate holder also move upwardly being carried upwardly by a spring 149.

The driver 41 is operated by the mechanism hereinbefore described and its downward descent operates the carrier slide and holder 20 in a manner well known to those skilled in this art and after the general manner described in United States Letters Patent to J. E. Perrault, machine for setting rivets, No. 879,895, patented February 25, 1908.

After the rivet has attached the hooked plate 32 and the disc 113 to the side 135 of the bag, as hereinbefore described, the bag is removed from the machine and is closed by the user bringing the side 136 of the bag into proximity with the side 135 thereof and folding the end portion 132 of the side 136 backwardly as shown in Fig. 9 in dotted lines, then the edge portion 143 of the side 135 is folded back as shown in dotted lines at 144 and the hooked plate 32 is slid from the position illustrated in full lines Fig. 9, to that shown in dotted lines therein, thus clamping the edge portions of the two sides of the bag, adjacent the opening thereof, together. After the disc has been attached to the bag as hereinbefore described, a new disc is fed into position over the anvil 132 by a partial rotation of the disc-feeding member 105 through the pawl and ratchet mechanism hereinbefore described and illustrated in Fig. 7, and at the same time that the new disc is fed over the anvil another disc is picked from the top of the discs 113 in the magazine 114 and the operation hereinbefore described is repeated, the discs being fed one by one from the magazine into the orifices in the disc-feeding member by the by the action of the weight 126, block 118 and pusher 128.

When the new disc is fed into position over the anvil, as above set forth, the bag is fed forward by the rotation of the disc-feeding member 105 and the disc 113 which has just been attached to the bag, and as this movement of the bag takes place the upwardly inclined projection 147 on the cap plate 130 lifts the bag and thus the disc which has just been clinched to the bag out of its orifice 112 in the disc-feeding member 105.

I claim:

1. A riveting machine having, in combination, a rivet feeding mechanism, a rivet setting mechanism embodying therein a driver, means to position a slotted piece of material between said driver and anvil, an anvil in alignment with said driver, and a rotary disc-feeding member adapted to position a disc between said anvil and driver and spaced apart from said slotted piece of material, whereby said disc may be riveted to one face of a piece of material interposed between said anvil and driver and said slotted piece of material riveted to the other face thereof.

2. A riveting machine having, in combination, a rivet carrier, a rivet driver, an anvil in alignment with said driver, means to position a slotted piece of material on said rivet carrier between said driver and anvil, mechanism adapted to operate said rivet driver and carrier, a disc feeding member adapted to position a disc between said anvil and driver and spaced apart from said slotted piece of material, and mechanism to impart an intermittent rotary movement to said disc feeding member, whereby said disc may be riveted to one face of a piece of material interposed between said anvil and driver and said slotted piece of material riveted to the other face thereof.

3. A riveting machine having, in combination, a rivet carrier, means to feed a rivet to said carrier, a rivet driving mechanism embodying therein a driver, an anvil in alignment with said driver, means to position a slotted piece of material on said rivet carrier between said driver and anvil, and a rotary disc-feeding member adapted to position a disc between said anvil and driver and spaced apart from said slotted piece of material, whereby said disc may be riveted to one face of a piece of material interposed between said anvil and driver and said slotted piece of material riveted to the other face thereof.

4. A riveting machine having, in combination, a rivet feeding mechanism, a rivet setting mechanism embodying therein a driver, an anvil in alignment with said driver, means to position a slotted piece of material between said driver and anvil, a rotary disc-feeding member adapted to position a disc with adhesive material on one face thereof between said anvil and driver and spaced apart from said slotted piece of material, and means to moisten the face of sheet material adjacent the adhesive face of said disc, whereby said disc may be riveted and adhesively attached to one face of a piece of material interposed between said anvil and driver and said slotted piece of material riveted to the other face thereof.

5. A riveting machine having, in combination, a rivet feeding mechanism, a rivet setting mechanism embodying therein a driver, an anvil in alignment with said driver, means to position a slotted piece of material between said driver and anvil, a rotary disc-feeding member adapted to position a disc between said anvil and driver and spaced apart from said slotted piece of material, and means to feed a disc to said rotary disc-feeding member, whereby said disc may be riveted to one face of a piece of material interposed between said anvil and driver and said slotted piece of material riveted to the other face thereof.

6. A riveting machine having, in combination, a rivet feeding mechanism, a rivet setting mechanism embodying therein a driver, an anvil in alignment with said driver, means to position a slotted piece of material between said driver and anvil, a rotary disc-feeding member provided with a plurality of concentric recesses therein, each adapted to receive a disc, and mechanism to impart an intermittent rotary motion to said disc-feeding member to intermittently position said discs between said anvil and driver and spaced apart from said slotted piece of material, whereby said discs may be riveted to one face of sheet material interposed between said anvil and driver and said slotted piece of material riveted to the other face thereof.

7. A riveting machine having, in combination, a rivet feeding mechanism, a rivet setting mechanism embodying therein a driver, an anvil in alignment with said driver, means to position a slotted piece of material between said driver and anvil, a rotary disc-feeding member provided with a plurality of concentric recesses therein each adapted to receive a disc with adhesive material on one face thereof, means to moisten the face of sheet material adjacent to that face of said disc with the adhesive material thereon, mechanism to impart an intermittent rotary motion to said disc feeding member to intermittently position said discs between said anvil and driver and spaced apart from said slotted piece of material, whereby said discs may be riveted and adhesively attached to one face of said sheet material interposed between said anvil and driver and said slotted piece of material riveted to the other face thereof.

8. A riveting machine having, in combination, a rivet feeding mechanism, a rivet setting mechanism embodying therein a driver, an anvil in alignment with said driver, means to position a slotted piece of material between said driver and anvil, a rotary disc-feeding member provided with a plurality of concentric recesses therein, each adapted to receive a disc, mechanism to impart an intermittent rotary motion to said disc-feeding member to intermittently position said discs between said anvil and driver and spaced apart from said slotted piece of material, whereby said discs may be riveted to one face of sheet material interposed between said anvil and driver and said slotted piece of material riveted to the other face thereof, and means to intermittently feed discs to said recesses.

9. A riveting machine having, in combination, a rivet feeding mechanism, a rivet setting mechanism embodying therein a driver, an anvil in alignment with said driver, means to position a slotted piece of material between said driver and anvil, a rotary disc-feeding member provided with a plurality of concentric orifices therein, each adapted to receive a disc, mechanism to impart an intermittent rotary motion to said disc-feeding member to intermittently position said discs between said anvil and driver and spaced apart from said slotted piece of material, whereby said discs may be riveted to one face of sheet material interposed between said anvil and driver and said slotted piece of material riveted to the other face thereof, a magazine adapted to contain a column of discs positioned beneath said disc-feeding member equidistant with said orifices from the center of said disc-feeding member, and means to force said discs one by one into said orifices as the orifices are intermittently brought into alignment with said magazine.

10. A riveting machine having, in combination, a rivet feeding mechanism, a rivet setting mechanism embodying therein a driver, an anvil in alignment with said driver, means to position a slotted piece of material between said driver and anvil, a rotary disc-feeding member provided with a plurality of concentric orifices therein, each adapted to receive a disc, mechanism to impart an intermittent rotary motion to said disc-feeding member to intermittently position said discs between said anvil and driver and spaced apart from said slotted piece of material, whereby said discs may be riveted to one face of sheet material interposed between said anvil and driver and said slotted piece of material riveted to the other face thereof, a magazine adapted to contain a column of discs positioned beneath said disc-feeding member equidistant with said orifices from the center of said disc-feeding member, means to force said discs one by one into said orifices as the orifices are intermittently brought into alignment with said magazine, and a disc supporting plate positioned beneath said rotary disc-feeding member and adapted to support discs in said disc-feeding member orifices as they are being fed from the magazine to the anvil.

11. A riveting machine having, in combination, a rivet feeding mechanism, a rivet setting mechanism embodying therein a driver, an anvil in alignment with said driver, means to position a slotted piece of material between said driver and anvil, a rotary disc-feeding member provided with a plurality of concentric orifices therein, each adapted to receive a disc, mechanism to impart an intermittent rotary motion to said disc-feeding member to intermittently position said discs between said anvil and driver and spaced apart from said slotted piece of material, whereby said discs may be riveted on one face of sheet material interposed between said anvil and driver and said slotted piece of material riveted to the other face thereof, a magazine adapted to contain a column of discs positioned beneath said disc-feeding member equidistant with said orifices from the center of said disc-feeding member, means to force said discs one by one into said orifices as the orifices are intermittently brought into alignment with said magazine, and a disc-supporting plate positioned beneath said rotary disc-feeding member and provided with concentric orifices in alignment with said anvil and magazine and adapted to support discs in said disc-feeding member orifices as they are being fed from the magazine to the anvil.

12. A riveting machine having, in combination, a rivet feeding mechanism, a rivet setting mechanism embodying therein a driver, an anvil in alignment with said driver, means to position a slotted piece of material between said driver and anvil, a rotary disc-feeding member provided with a plurality of concentric orifices therein, each adapted to receive a disc, mechanism to impart an intermittent rotary motion to said disc-feeding member to intermittently position said discs between said anvil and driver and spaced apart from said slotted piece of material, whereby said discs may be riveted to one face of sheet material interposed between said anvil and driver and said slotted piece of material riveted to the other face thereof, a magazine adapted to contain a column of discs positioned beneath said disc-feeding member equidistant with said orifices from the center of said disc-feeding member, means to force said discs one by one into said orifices as the orifices are intermittently brought into alignment with said magazine, and a cap plate extending over said disc-feeding member to hold the discs in said orifices while they are being fed from the magazine to the anvil.

13. A riveting machine having, in combination, a slide, a holder embodying a pair of oppositely disposed plates spring mounted on said slide and recessed to receive a piece of flat material with a slot extending longitudinally thereof, said holder having a chamber between said plates adapted to receive and position a two-pronged rivet therein with said prongs in alignment with said slot, a driver in alignment with said chamber, an anvil in alignment with said driver, means to position a disc between said anvil and driver, and mechanism to impart a reciprocatory motion to said driver and slide, whereby said slotted piece of material may be fastened by said rivet to one face of a piece of material interposed between said anvil and slide and said disc riveted to the other face thereof.

14. A riveting machine having, in combination, a slide, a holder embodying a pair of oppositely disposed plates spring mounted on said slide and recessed to receive a piece of flat material with a slot extending longitudinally thereof, said holder having a chamber between said plates adapted to receive and position a two-pronged rivet therein with said prongs in alignment with said slot, a driver in alignment with said chamber, an anvil in alignment with said driver, a rotary disc-feeding member adapted to position a disc between said anvil and driver, and mechanism to impart a reciprocatory motion to said driver and slide, whereby said slotted piece of material may be fastened by said rivet to one face of a piece of material interposed between said anvil and slide and said disc riveted to the other face thereof.

15. A riveting machine having, in combination, a slide, a holder embodying a pair of oppositely disposed plates spring mounted on said slide and recessed to receive a piece of flat material with a slot extending longitudinally thereof, said holder having a chamber between said plates adapted to receive and position a two-pronged rivet therein with said prongs in alignment with said slot, a driver in alignment with said chamber, an anvil in alignment with said driver, a rotary disc-feeding member adapted to position a disc with adhesive on one face thereof between said anvil and driver, means to moisten the face of a piece of sheet material positioned adjacent the adhesive face of said disc, mechanism to impart an intermittent rotary motion to said rotary disc-feeding member, and mechanism to impart a reciprocatory motion to said driver and slide, whereby said slotted piece of material may be fastened by said rivet to one face of said sheet material and said disc riveted and adhesively attached to the other face thereof.

16. A riveting machine having, in combination, a slide, a holder and carrier embodying a pair of oppositely disposed spring arms fast to said slide and spaced apart, a pair of oppositely disposed plates fast to the lower ends of said arms, the under faces of said plates each being provided with a groove, which grooves combine to form a guideway adapted to receive and hold a flat piece of material with a slot extending longitudinally thereof, and a stop at one end of said guideway adapted to position said flat piece of material on said holder and carrier, said holder and carrier having a chamber between said plates adapted to receive and position a two-pronged rivet therein with said prongs in alignment with said slot, a driver in alignment with said chamber, an anvil in alignment with said driver, a rotary disc-feeding member adapted to position a disc between said anvil and driver, and mechanism to impart a reciprocatory motion to said driver and slide, whereby said slotted piece of material may be fastened by said rivet to one face of a piece of material interposed between said anvil and slide and said disc riveted to the other face thereof.

17. A riveting machine having, in combination, a slide, a holder embodying a pair of oppositely disposed plates spring mounted on said slide and recessed to receive a piece of flat material with a slot extending longitudinally thereof, said holder having a chamber between said plates adapted to receive and position a two-pronged rivet therein with said prongs in alignment with said slot, a driver in alignment with said chamber, an anvil in alignment with said driver, and mechanism to impart a reciprocatory motion to said driver and slide, whereby said slotted piece of material may be fastened by said rivet to a piece of material interposed between said driver and anvil.

In testimony whereof I have hereunto set my hand.

ARTHUR R. HAVENER.